No. 740,357. PATENTED SEPT. 29, 1903.
J. H. EASTMAN & G. L. WEAVER.
CIRCUIT CONTROLLER FOR ELECTRIC FLASH SIGNS.
APPLICATION FILED JAN. 8, 1903.
NO MODEL. 2 SHEETS—SHEET 1.
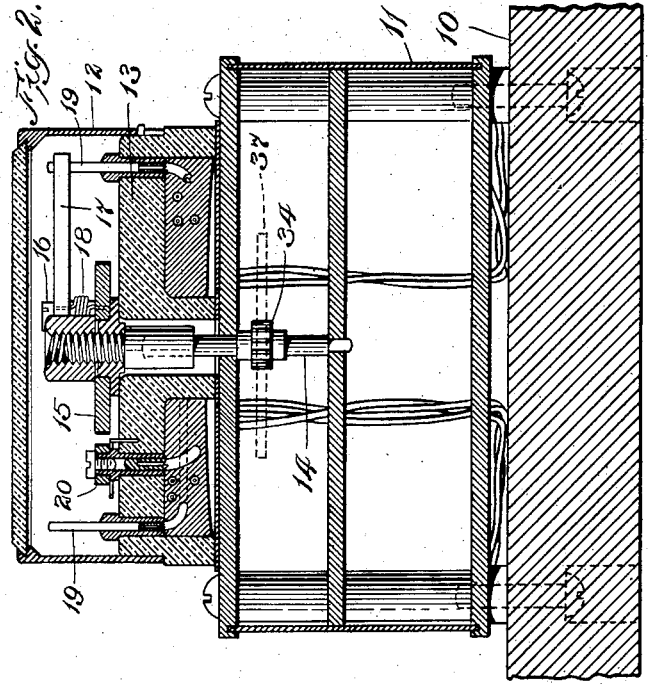
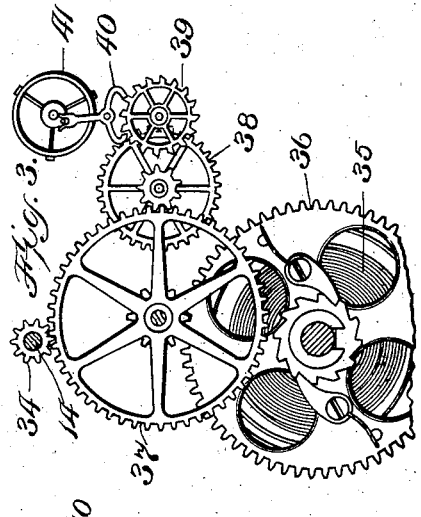
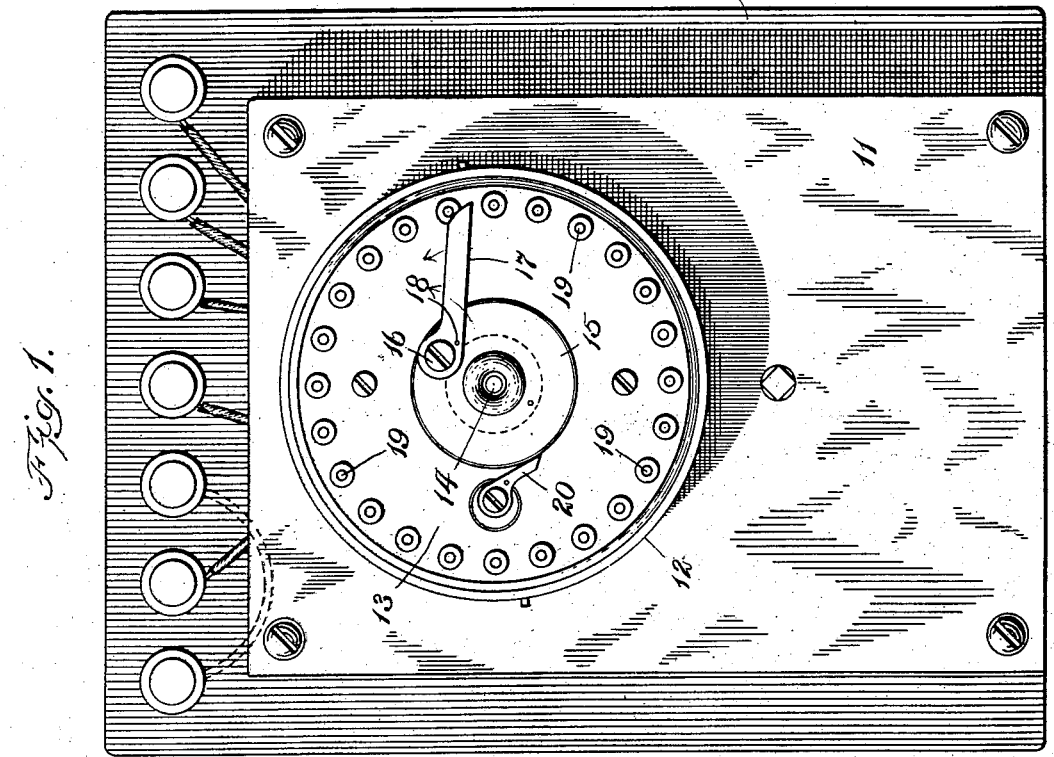

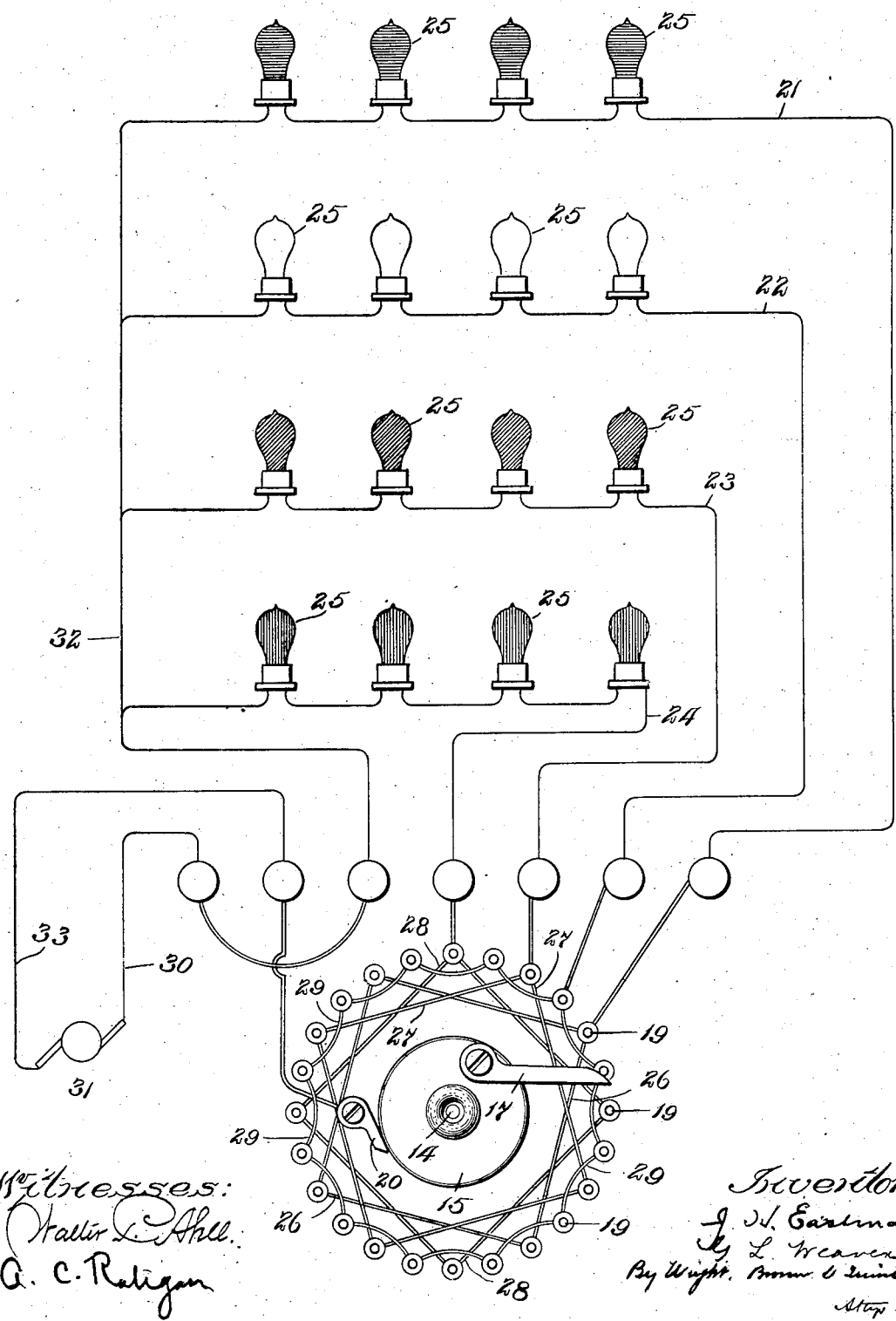

No. 740,357. Patented September 29, 1903.

UNITED STATES PATENT OFFICE.

JOSEPH H. EASTMAN AND GEORGE L. WEAVER, OF BOSTON, MASSACHUSETTS, ASSIGNORS TO AUTOMATIC TIME SWITCH COMPANY, OF BOSTON, MASSACHUSETTS, A CORPORATION OF MAINE.

CIRCUIT-CONTROLLER FOR ELECTRIC FLASH-SIGNS.

SPECIFICATION forming part of Letters Patent No. 740,357, dated September 29, 1903.

Application filed January 8, 1903. Serial No. 138,184. (No model.)

*To all whom it may concern:*

Be it known that we, JOSEPH H. EASTMAN and GEORGE L. WEAVER, of Boston, in the county of Suffolk and State of Massachusetts, have invented certain new and useful Improvements in Circuit-Controllers for Electric Flash-Signs, of which the following is a specification.

This invention relates to electric signs in which the lamps are alternately flashed and extinguished; and its object is to provide a feasible construction of controller for employment in connection with a slow-moving motor, such as a clock-train. If a controller employing a clock-motor is to be a commercial success, it must not require to be wound too often, and for this reason the circuit-actuator must be attached to a slow-moving part of the train, such as the second wheel. If attached to a fast-moving part, such as the escape-wheel, there will in general be insufficient power in the train to overcome the friction and propel the circuit-controller. On the other hand, if attached to a slow-moving part there will be difficulty in securing a sufficiently-rapid separation of the fixed and moving contacts of the controller—that is to say, if the contact is broken too slowly destructive arcing will occur, and difficulty will also be encountered in securing an immediate transition from one phase of illumination to the next, as is often desired. These difficulties attending the use of clock-trains have usually led to the employment of electric motors for operating the controllers in flash-signs; but such motors are costly and their operation is attended with expense and some danger.

In carrying our invention into effect we employ a resilient connection between the fixed and moving parts of the controller in order that the connection in each section of the controller may endure beyond the time corresponding to the actual position of the moving part and the transition to the next connection be made abruptly.

Of the accompanying drawings, Figure 1 represents a front elevation of a circuit-controller for flash-signs as constructed according to our invention. Fig. 2 represents a horizontal section thereof. Fig. 3 represents an elevation of the clock-train. Fig. 4 represents a diagrammatic view of a permissible arrangement of circuits.

The same reference characters indicate the same parts in all the figures.

In the drawings, 10 is a base, to which is fixed a clock-train casing 11 and in front of this a cylindrical casing 12, containing an insulating-block 13. In the center of said block is journaled a shaft or arbor 14, carrying at its outer end a conductive plate or carrier 15, provided with a stud 16, on which is eccentrically pivoted an oscillatory brush or contact-arm 17, pressed yieldingly forward or in the direction indicated by the arrow $x$ by a spring 18, Fig. 2. Around the central shaft is arranged an annular series of fixed contact-pins 19 19, mounted in the block 13, and also mounted on said block is a brush or contact-dog 20, having constant contact with the edge of carrier 15. In Fig. 4 we have assumed for the sake of illustration a series of four lamp-circuits 21 22 23 24, containing incandescent lamps 25 25 and connected to the several contact-pins 19. Circuits 21 23 24 each include four of the pins 19, connected by wires 26 27 28, and the circuit 22 includes every alternate pin 19, the connections between pins in this last circuit being made by wires 29. One lead, 30, of a dynamo 31 connects with a return-wire 32, common to the four lamp-circuits, and the other lead, 33, connects with brush 20. The effect of this arrangement is that as the contact-arm 17 rotates in contact with the pins 19 the lamps of the three circuits 21 23 24, which may be of contrasting colors, are flashed in rotation, and the lamps of the circuit 22, which may be white, are flashed alternately with the colored circuits or between each two colored circuits. The invention is applicable to various other arrangements of circuits, and the above is selected merely to illustrate an operative embodiment.

The arbor 14 is continued from casing 12 into casing 11 and is there provided with a pinion 34, connecting with a clock-train motor. (Shown in Fig. 3, but mainly omitted in Fig. 2.) The train, as shown, embodies a spring 35, main wheel 36, second wheel 37, third wheel 38, escapement-wheel 39, escapement 40, and balance 41, as well as the necessary connecting arbors and pinions. The pinion 34 is geared into the second wheel 37, and being thus connected to an intermediate part of the train having a relatively slow movement, and therefore relatively high-powered, it is rotated with ample power to propel the arbor 14 and rotate contact-arm 17.

The length of contact-arm 17 being greater than the radial distance from its stud 16 to the circle of pins 19, it is evident that as said arm is revolved in the direction of the arrow $y$ its outer end will stay in contact with each pin 19 until the carrier 15 has rotated ahead and the arm 17 swung backwardly on its axis sufficiently to allow said arm to escape from said pin. When the escape of the contact-arm occurs, the contact is broken very suddenly by reason of the acceleration or forward yielding pressure exerted by spring 18. The transition from pin to pin is also very short, as the spaces between the pins are of such length that the arm 17 on leaving one pin 19 instantly brings up under the influence of the spring against the next one of the series, and the flashing and extinguishment of the circuits is therefore abrupt, which is a desirable attainment.

It will be seen that the fixed contact-pins and the revolving spring-pressed contact-arm relatively arranged and operating as set forth constitute a very simple and efficient embodiment of a circuit closing and breaking device having provisions for intermittently accelerating the movements of the arm or movable member of said device to cause a quick transfer of the said movable member from each pin or fixed member to the next, and thus compensate for the relatively slow movement of the carrier. Each fixed member is arranged to serve as a stop to limit the accelerated forward movement of the movable member between it and the preceding pin, so that the movable member not only leaves each pin very abruptly and quickly, but makes contact with the succeeding pin with equal abruptness and quickness. There is therefore no liability of arcing, there being no possibility of the movable member stopping at any point between two fixed members or of slowly receding from or slowly approaching either fixed member.

Our invention is not wholly limited to the details herein shown, as various modifications may be adopted without departing from the spirit of the invention.

We claim—

1. In a circuit-controller for electric flash-signs, the combination of a rotary carrier, a driving train or movement, connections between the carrier and a relatively slow-moving and high-powered member of said movement and a circuit closing and breaking device including a series of fixed members, and a movable member which is revolved by said carrier, said circuit closing and breaking device having provisions for intermittently accelerating the movements of the movable member to compensate for the relatively slow movement of the carrier, the fixed members being arranged so that each in turn acts as a stop to limit the accelerated movement of the movable member.

2. In a circuit-controller for electric flash-signs, the combination of a series of circuits having fixed contact-pins arranged in an annular series and separated by relatively narrow intermediate spaces, a rotary carrier within the circle of pins, a driving train or movement, connections between the carrier and a relatively slow-moving and high-powered member of said movement, a contact-arm eccentrically pivoted to the carrier and of greater length than the radial distance between its pivot and the circle of pins, the outer end of the arm being arranged to make contact with the pins successively, and a spring yieldingly connecting the arm with the carrier and adapted to force the arm yieldingly forward or in the direction of movement of the carrier, said spring permitting the arm to yield and have an extended contact with each pin, and giving the arm an accelerated forward movement after it leaves the pin to compensate for the slow rotation of the carrier, the space between each pin and the next being such that the said accelerated movement of the arm brings it into contact with the succeeding pin.

3. In a circuit-controller for electric flash-signs, the combination of a series of circuits having fixed contact-pins arranged in an annular series and separated by relatively narrow intermediate spaces, a rotary carrier located within the circle of pins and substantially concentric therewith, a contact-arm eccentrically pivoted to the carrier and of greater length than the radial distance between its pivot and the circle of pins, whereby the outer end of the arm is caused to yield by its contact with each pin, and a spring yieldingly connecting the arm with the carrier and adapted to hold the arm yieldingly against each pin and to force the arm forward against the next pin, the spaces between the pins being such that each pin acts as a stop to limit the forward movement imparted to the arm by the spring.

In testimony whereof we have affixed our signatures in presence of two witnesses.

JOSEPH H. EASTMAN.
GEORGE L. WEAVER.

Witnesses:
R. M. PIERSON,
ADELINE C. RATIGAN.